United States Patent [19]

Martuch et al.

[11] 4,336,087
[45] Jun. 22, 1982

[54] METHOD OF MARKING FISHING LINES

[76] Inventors: Leon L. Martuch; Michael L. Martuch, both of 9187 Bay Hill Blvd., Orlando, Fla. 32811

[21] Appl. No.: 248,864

[22] Filed: Mar. 30, 1981

[51] Int. Cl.³ .................. B29C 27/00; B32B 31/26
[52] U.S. Cl. .................................. 156/85; 40/316; 43/44.98; 156/86; 264/230; 264/342 R
[58] Field of Search .................... 156/84, 85, 86; 264/230, 342 R; 40/316; 174/DIG. 8; 43/44.98

[56] References Cited

U.S. PATENT DOCUMENTS

| | | | |
|---|---|---|---|
| 1,317,146 | 9/1919 | Welles | 156/86 |
| 3,331,720 | 7/1967 | Watson | 156/86 |
| 3,400,481 | 9/1968 | Christenson | 156/86 |
| 3,714,316 | 1/1973 | Angeloff | 156/86 |
| 4,032,010 | 6/1977 | Evans | 264/230 |
| 4,140,412 | 2/1979 | Vitt | 174/DIG. 8 |

OTHER PUBLICATIONS

"Alphlex Shrinkable Tubing", Catalog ST-27, Alph Wire Corporation, 1961.

*Primary Examiner*—Caleb Weston
*Attorney, Agent, or Firm*—William M. Hobby, III

[57] ABSTRACT

A process of marking fly fishing lines includes the steps of selecting a heat shrinkable tubing having predetermined shrinking temperature characteristics and marking the tubing with a size coding positioned to allow the marks to be cut off to indicate any of a range of fishing line sizes or weights. The tubing is then cut to form small sections with the marking thereon and may then further be cut to remove marks to indicate one size. The tubing is slipped onto a fly fishing line and immersed in a heated liquid, such as water, or water having salt added thereto, to shrink the tubing onto the fishing line without damaging the fishing line.

9 Claims, 3 Drawing Figures

METHOD OF MARKING FISHING LINES

BACKGROUND OF THE INVENTION

The present invention relates to a process for marking fly fishing lines so that a fisherman can readily identify the size or weight of the line on the fishing reel or in storage.

Fly fisherman commonly have a variety of fly lines of different weights. In fly fishing, the weight of the line itself is the weight that is cast since the fly or lure has little or no weight. The weight of the line must balance with the rod with which it is used. The weight of the line is critical to casting performance. The use of a line of the incorrect weight for the rod will give unsatisfactory performance. Each fly fishing rod is marked with the weight of line to be used with it. The rods are marked using a numbering system developed by the American Fishing Tackle Manufacturers Association (AFTMA). Each AFTMA number corresponds to a specified weight of fly line as measured in grains of weight over the first thirty feet of line. Thus, a rod marked with an AFTMA Number 7 should be used with a fly line of AFTMA Number 7 weight. Each fly line is sold in a package marked with the AFTMA number weight of the line. However, lines themselves are not marked because of their small diameter and also because of their varying colors. Once the fisherman removes the line from the package, he finds it difficult or impossible to be sure of the AFTMA line weight. Fly fisherman frequently change lines. In some cases, because they are changing rods. In other cases, because they are changing from a floating line to a sinking line to match the fishing conditions. Sometimes they change lines by changing from one reel filled with line to another reel filled with a different line. Sometimes they use reels having interchangeable spools and change from one spool to another. Sometimes they remove one line from the reel spool and wind another line on the spool in its place. This all results in confusion as to the AFTMA weight of the line and therefore as to the rod with which it should be used.

The present invention provides a simplified method for a fisherman to mark his fly fishing lines by the purchase of an inexpensive package of pre-marked pieces of heat shrinkable tubing which can be applied without damaging the fishing line. Heat shrinkable tubing is available, which will shrink slightly below 212° F. or 100° C., so that shrinking can be accomplished in boiling water in a fairly safe manner by dipping a piece of tubing slipped over a fishing line into the boiling water with less risk of the fisherman getting burned or the line getting damaged by high temperature. At higher altitudes, common table salt can be added to the boiling water so that the water can reach the desired temperature. The marking system marks each piece of tubing so that the fisherman can snip off one or two pieces of tubing to leave the correct number of marks on the tubing, which is to be applied to the line.

SUMMARY OF THE INVENTION

A method of marking fishing lines includes the steps of selecting heat shrinkable tubing which will shrink at a predetermined temperature, such as 90° C., in a desired color. Marking the tubing with a predetermined code of marks, such as two large marks followed by four small marks, cutting the tubing so that each piece of tubing has a desired marking on it. The process includes the steps of cutting the marked tubing to remove the coded marks as desired, slipping the cut tubing onto a fishing line and immersing the heat shrinkable tubing on a fishing line into boiling water, or other liquid, to shrink the tubing onto the line.

BRIEF DESCRIPTION OF THE DRAWINGS

Other objects, features and advantages of the invention will be apparent from the written description and the drawings in which.

DESCRIPTION OF THE PREFERRED EMBODIMENT

Figure 1:
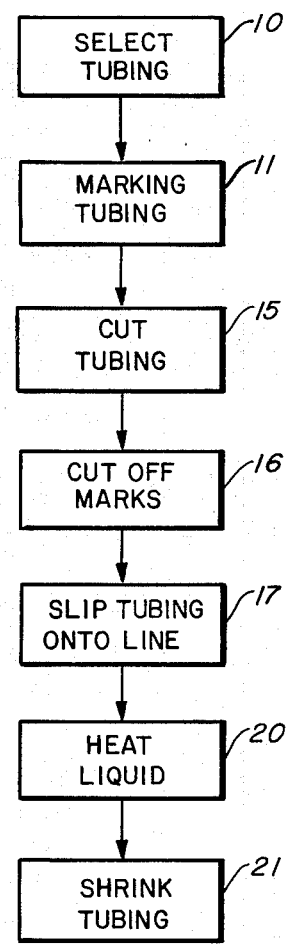
FIG. 1 is a flow diagram of a preferred process in accordance with the present invention.
Figure 2:
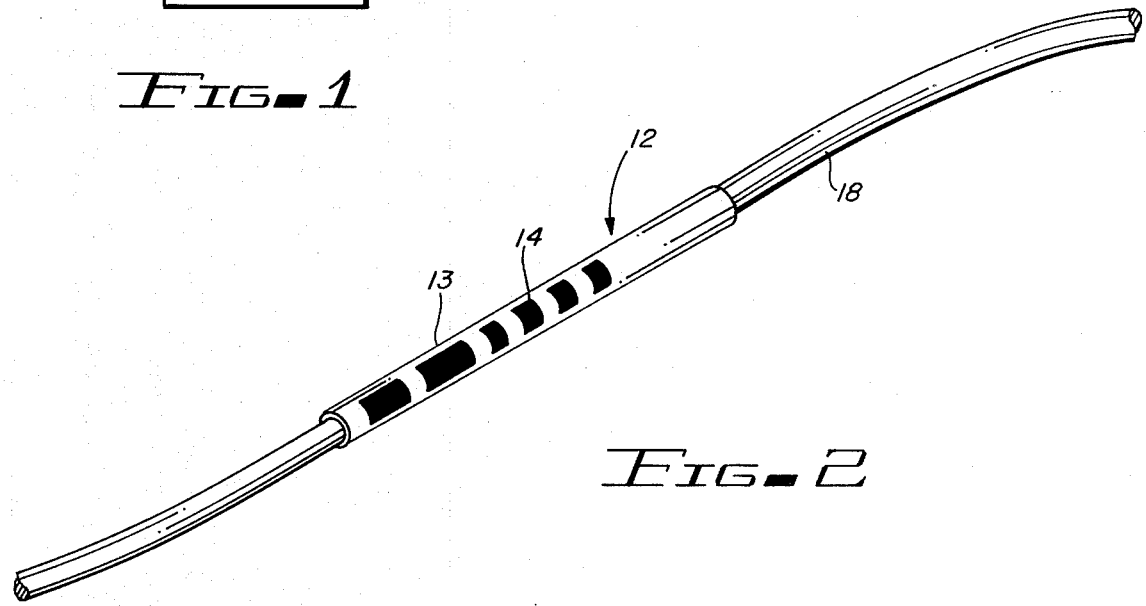
FIG. 2 is a perspective view of marked heat shrinkable tubing placed on a fishing line in accordance with a process of FIG. 1.

Referring to FIGS. 1 and 2 of the drawings, a method of marking fishing lines is provided which requires the selection of heat shrinkable tubing, which tubing shrinks under a low shrink temperature so that it can be shrunk in boiling water, therein preventing risk to the fishing line. A very flexible, polyolefin, and heat shrinkable tubing having a very low shrink temperature may be obtained which has a shrink temperature of approximately 90° C. and 194° F. One such tubing can be seen in Raychem Corporation's flexible polyolefin product No. RT-876, which may be selected in black, white, red, yellow and blue colors. The tubing is selected in the first Step 10 of the flow diagram of FIG. 1, which tubing is marked in the second Step 11. The permanent marking of a polymer material to withstand heavy use on a fishing line is accomplished by a commercial process of marking the tubing with powdered carbon and fusing the carbon to the tubing with heat.

Figure 3:
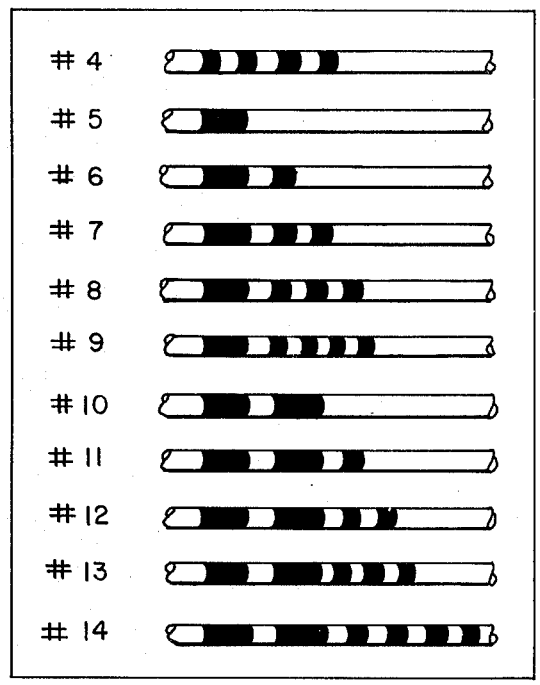
FIG. 3 is a chart of the codes of different line sizes.

A preferred marking is shown in FIG. 2 on the heat shrinkable tubing strip 12 having a pair of large markings 13 and four small markings 14. The large markings 13 could also be large dots rather than dashes, while the small markings 14 could be small dots rather than dashes, or any other large and small identification desired. The range of fishing line weights to be identified is from four to fourteen, and each of the large markings 13 indicates five, while each of the small markings 14 indicates one. Thus, the markings shown in FIG. 2 indicates a line size 14 any by clipping off or removing one to four of the small markings, a line weight number can indicate ten to thirteen, and by clipping off or removing one or two of the large markings with any combination of the small markings, a line size can be identified from one to fourteen. The chart of FIG. 3 shows tubing cut to indicate each line weight from four to fourteen. AFTMA line sizes currently cover only sizes four to eleven, but since heavier lines are sometimes used, the AFTMA standard has been extended by fishermen to cover line weights of twelve to fourteen. A fisherman can pick up a piece of marked tubing 12 and with a pair of scissors or knife cut off from each end to remove large or small markings 13 and 14 to indicate the line weight. The marked tubing 12 is cut in Step 15 in sections having markings 13 and 14. The fishermen then cuts the tubing in Step 16 to indicate the size of the line as seen in FIG. 3, and slides the cut tubing of Step 17 onto a fishing line 18, as shown in FIG. 2. The fishing line 18 having the heat shrinkable tubing 12 slid thereon is then immersed into a heating liquid at 20, which may be water, which is commonly available to the fisherman at home or at a fishing camp. At higher altitudes, the fisherman might be required to add common table salt to compensate for the lower boiling temperature, thereby heat shrinking the tubing 12 onto the fishing line 18 in accordance with Step 21.

Heat shrinkable tubing, which is commonly used as insulation for electronic terminals, or the like, are manufactured by irradiating the polymers, which are then heated, expanded and cooled to retain the expanded dimension and are then shrunk by heating to the predetermined temperature for the selected material. The use of this tubing with a preselected coded marking in shortened lengths is ideal for marking fishing lines without damage to the fishing line and without the great expense inherent in some marking systems, and such markings can be accomplished by the fisherman to identify the fishing line, whether in storage or on the fishing reel spool. The light weight of the tubing and its flexibility allow it to be used without affecting the fishing or casting characteristics of the line. The heat shrinkable material and the markings are quite permanent against damage from the water during fishing and from minor abrasions and allow the quick, ready identification of the fishing line.

It should be clear at this point that a method has been provided which allows the rapid marking of fishing lines by an individual fisherman. But, it should be clear that the present method is not to be construed as limited to the particular forms shown, which are to be considered illustrative rather than restrictive.

I claim:

1. A method of marking fishing lines comprising the steps of:
    selecting heat shrinkable tubing;
    marking said heat shrinkable tubing with a plurality of size code marks;
    cutting said marked, heat shrinkable tubing between said marks thereon to leave at least one mark on one piece of cut tubing indicating a fishing line size;
    slipping said marked and cut heat shrinkable tubing onto a fishing line of the size indicated by the marks thereon; and
    shrinking said heat shrinkable tubing onto said fishing line, whereby a fishing line is marked for size.

2. A method of marking fishing lines comprising the steps of:
    selecting heat shrinkable tubing;
    marking said heat shrinkable tubing with a size code;
    cutting said marked, heat shrinkable tubing;
    slipping said marked and cut heat shrinkable tubing onto a fishing line; and
    shrinking said heat shrinkable tubing onto said fishing line by heating a liquid and immersing said heat shrinkable tubing slipped on a fishing line into said heating liquid to thereby shrink said tubing onto said fishing line.

3. A method in accordance with claim 1, in which said step of shrinking said heat shrinkable tubing onto said fishing line includes a step of heating a liquid and immersing said heat shrinkable tubing slipped on a fishing line into said heated liquid to thereby shrink said tubing onto said fishing line.

4. A method in accordance with claim 2, in which said step of shrinking said heat shrinkable tubing onto a fishing line includes immersing said heat shrinkable tubing into heated water.

5. A method in accordance with claim 4 or 2, in which the step of shrinking said heat shrinkable tubing onto a fishing line includes immersing said heat shrinkable tubing on a fishing line into heated water having table salt dissolved therein.

6. A method in accordance with claim 1, in which the step of marking said heat shrinkable tubing includes marking said tubing with two large marks and four small marks positioned so that cutting one end of a piece of tubing removes small marks and cutting the other end at predetermined position removes one or two large marks.

7. A method in accordance with claim 6, in which the step of cutting said marked heat shrinkable tubing includes cutting a predetermined number of small and large marks to indicate line sizes from four to fourteen.

8. A method in accordance with claim 1, in which the step of selecting heat shrinkable tubing indicates selecting a heat shrinkable flexible polyolefin heat shrinkable tubing.

9. A method in accordance with claim 1, in which the step of marking said heat shrinkable tubing includes marking said tubing with a powdered carbon and heating said carbon to fuse said powdered carbon on said tubing.

* * * * *